United States Patent [19]

Selle

[11] 3,724,323
[45] Apr. 3, 1973

[54] ROTATABLE HATCH COVER FOR ARMORED VEHICLES

[75] Inventor: Wolfgang H. Selle, Milpitas, Calif.

[73] Assignee: Lockheed Aircraft Corporation, Burbank, Calif.

[22] Filed: Mar. 10, 1971

[21] Appl. No.: 122,688

[52] U.S. Cl. .......................................89/36 L, 49/40
[51] Int. Cl. ...............................................F41h 5/22
[58] Field of Search ..........49/40, 41; 109/64, 73, 74, 109/75; 244/121; 89/36 H, 36 Z, 36 J, 36 K, 36 L, 36 C, 40 B

[56] References Cited

UNITED STATES PATENTS

| 1,156,738 | 10/1915 | Anderson | 49/40 |
| 1,264,804 | 4/1918 | Jacobs | 49/40 |
| 1,940,444 | 12/1933 | Burgman | 49/40 |
| 790,110 | 5/1905 | Corbitt | 49/40 |
| 1,824,462 | 9/1931 | Bittinger | 89/36 K |
| 2,384,646 | 9/1945 | Schwab | 89/36 H |

FOREIGN PATENTS OR APPLICATIONS

| 434,843 | 9/1935 | Great Britain | 89/36 Z |

Primary Examiner—Stephen C. Bentley
Attorney—Paul F. Morgan and George C. Sullivan

[57] ABSTRACT

An improved hatch for an armored vehicle wherein an armored collar extending above the armored surface at one side of the hatch opening mates with a rotatable, truncated dome shaped hatch cover to enclose the hatch opening. The hatch cover pivots in a balanced manner down into the hatch opening adjacent to, and inside of, the armored collar to provide an unobstructed hatch opening with improved visibility and protection.

3 Claims, 4 Drawing Figures

WOLFGANG H. SELLE, *INVENTOR.*

WOLFGANG H. SELLE, INVENTOR.

BY _George C. Sullivan_
Agent

_Paul F. Morgan_
Attorney

ROTATABLE HATCH COVER FOR ARMORED VEHICLES

The present invention relates to an improved hatch for an armored vehicle which combines a rotatable partial cover with an upstanding armored partial collar. The invention provides improvements in ingress and egress through the hatch opening, personnel armor protection, visibility, conservation of space and movement, and ease of opening and closing.

It will be appreciated that various rotatable hatch cover arrangements are known in the prior art. Examples are illustrated in U. S. Pat. Nos. 1,351,742, 2,375,240, 2,384,646, 2,490,664 and 2,726,054. Another example is a side hatch on the U. S. Army M551 (General Sheridan) tracked vehicle. However, non of these references provide the structure and advantages of the present invention.

It will also be appreciated that a hatch cover for an armored vehicle presents a specialized problem because of the thickness and weight of the armor material from which it is constructed, and because of the necessity for a complete and continuous closure to prevent any projectiles from passing through the hatch opening into the interior of the armored vehicle. The hatch of the invention provides these and other advantages. It is desirable also in an armored vehicle to provide a hatch cover which allows a seated crew member in the vehicle to open and close the hatch without adjustment of his seat height or ducking or standing up. With the hatch of the invention the crew member at the hatch may remain seated in the same position in both the open and closed positions of the hatch cover. The crew member may easily reach up and quickly open or close the hatch cover without moving from his seat or position. The hatch cover of the invention may also be partially opened to provide unrestricted forward vision while still providing overhead protection.

Further objects, features and advantages of the invention pertain to the particular arrangement and structure whereby the above-mentioned aspects of the invention are attained. The invention will be better understood by reference to the following description and to the drawings forming a part thereof, wherein.

Figure 1:
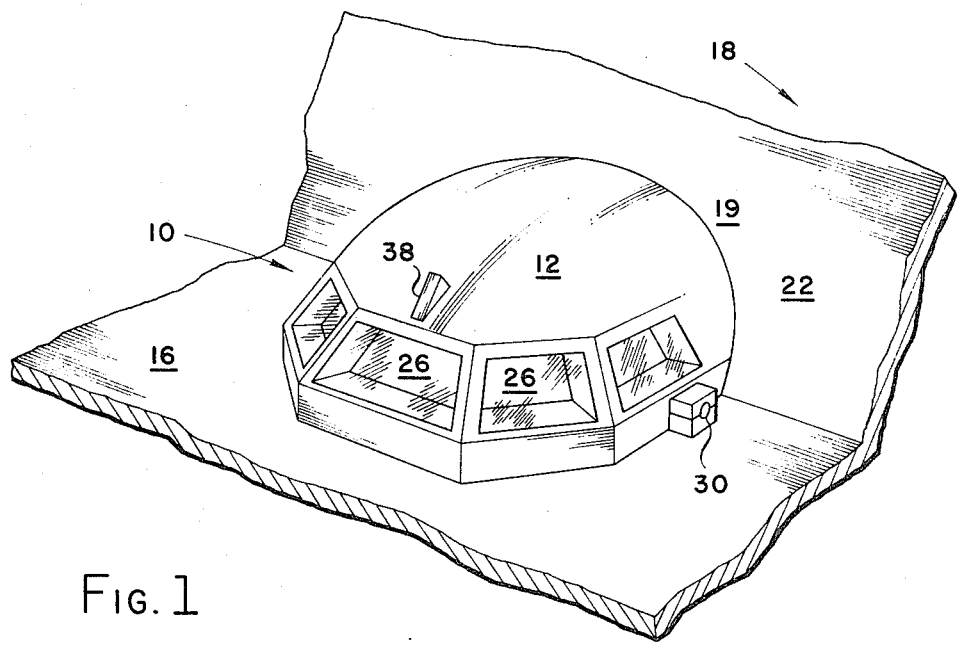
FIG. 1 is a high frontal perspective view of an improved hatch in accordance with the present invention, showing a portion of an armored vehicle sufficient to show the connection therewith.
Figure 2:
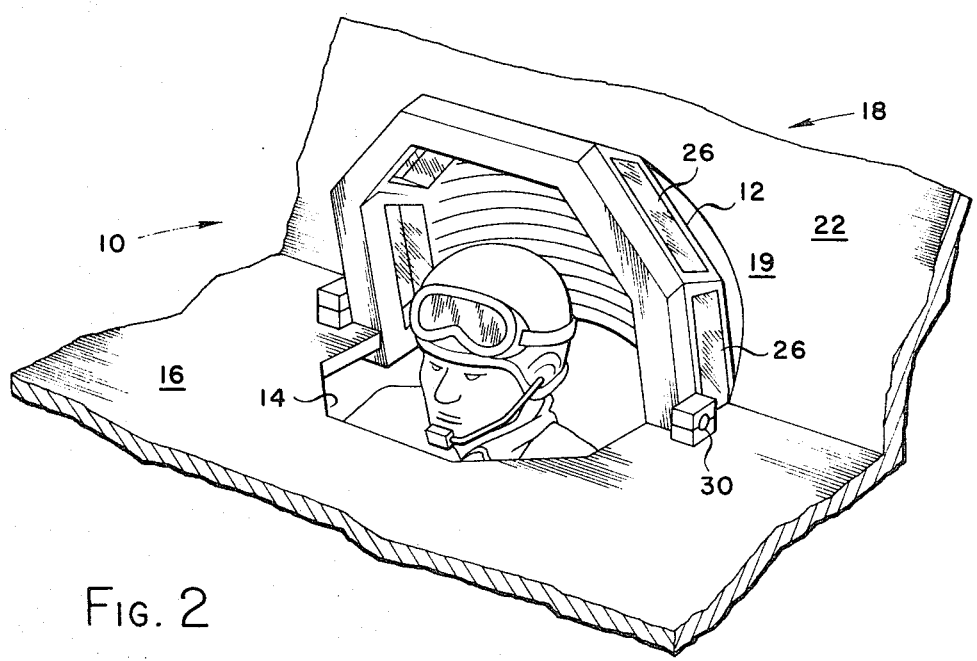
FIG. 2 is the same view of the embodiment of FIG. 1 with the hatch cover in its open position.

Referring first to FIGS. 1 and 2 of the drawings, there is shown therein an exemplary hatch 10 in accordance with the present invention. The hatch 10 has a dome-shaped rotatable hatch cover 12 extending above a hatch opening 14 in a substantially horizontal armored surface 16 of an armored vehicle 18. Also extending above the armored surface 16 and mating with the hatch 12 cover in its closed position is an armored collar 19. This collar 19 co-operatively engages the hatch cover 12 to fully enclose the hatch opening 14. The hatch cover 12 is rotatably mounted to a pair of pivot bearings 30 about a central axis of rotation.

Figure 3:
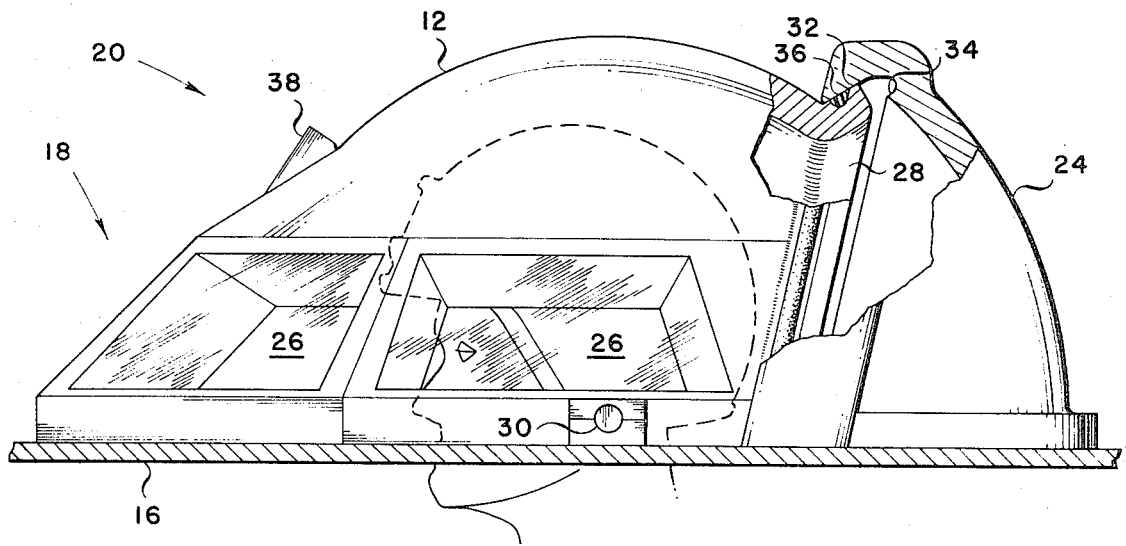
FIG. 3 is a side elevation, partially broken away in central cross-section, of another embodiment of the hatch of FIGS. 1 and 2.
Figure 4:
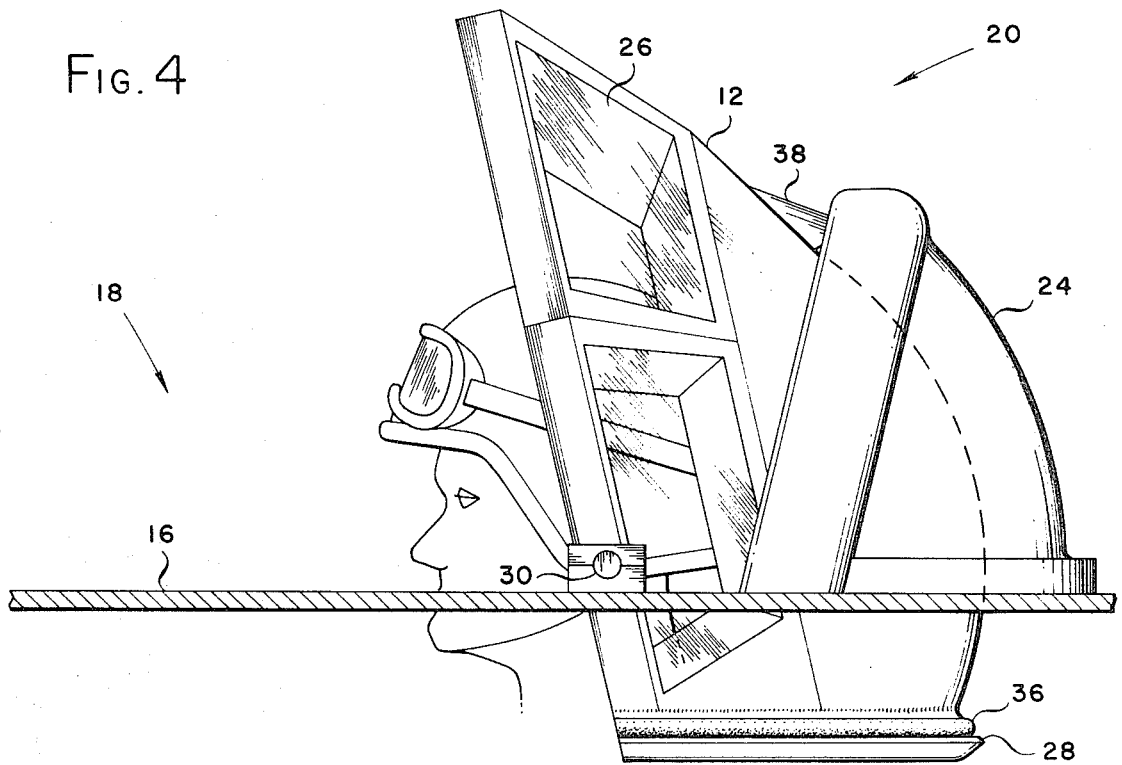
FIG. 4 is the same view of the hatch of FIG. 3 shown in its open position.

FIGS. 3 and 4 illustrate another hatch 20 which is substantially identical to the hatch 10 of FIGS. 1 and 2. The only difference is that the entire hatch 20 of FIGS. 3 and 4 mounts to and extends above the planar armored surface 16 of the armored vehicle 18. In contrast, the hatch 10 of FIGS. 1 and 2 is built into the intersection of the armored surface 16 with a second armored surface 22 extending upwardly from the armored surface 16. In the hatch 10 the angular intersection of the two armored surfaces 16 and 22, which is commonly found on armored vehicles, is utilized as part of the hatch to provide the collar 19. For this reason the collar 19 of the hatch 10 may be smaller than the corresponding collar 24 of the hatch 20. The hatch cover 12 and all other components of the two hatches 10 and 20 may be identical, as shown here. Accordingly, it will be appreciated that the description herein applies to all of the figures unless otherwise indicated. Both the collar 19 and the collar 24 preferably extend horizontally around the rear edge of the hatch opening, from one pivot bearing 30 to the other, and extends less than 90° vertically from the armored surface 16.

Considering the configuration of hatch cover 12, it may be seen that it is a generally hemispherical shell, constructed of armor protective material. Vision blocks 26 of bullet proof transparent material through the armor are provided around the lower edge of the hatch cover 12 so as to provide forward and side visability for the operator when the hatch is closed, as illustrated in FIGS. 1 and 3. The vision blocks 26 extend around the hatch cover 12 on the sides other than the collar side.

As may be seen clearly in FIGS. 3 and 4 most of the hatch cover 12 rearwardly of the bearings 30 is cut off, and it has a planer bottom edge, so that its general configuration is that of a truncated half clamshell. The hatch cover 12 is truncated there by a substantially planer edge surface, which edge is substantially vertical in the closed hatch position, substantially horizontal in the open hatch position and substantially parallel the axis of rotation of the hatch cover. Along this truncated rear edge of the hatch cover there is provided an outwardly projecting continuous sealing lip 28. (Note FIG. 4) It may be seen that by the truncation of the hatch cover 12 that the hatch cover itself only partially encloses the hatch opening 14 even in the fully closed position and that it extends less than 180° about its axis of rotation.

The rotation of the hatch cover 12 is provided by the pivot bearings 30, which are connected to the armored surface 16 at opposite sides of the hatch opening 14, parallel to the front of the collar. The pivot bearings 30 are positioned to provide substantially balanced opening of the hatch cover about their horizontal axis of rotation centrally of the hatch cover. The axis rotation provided between the two pivot bearings 30 is adjacent (somewhat behind) the center of gravity of the hatch cover and therefore the hatch cover 12 may be rotated open by the operator with much less effort than would be required for a hatch cover of corresponding armor weight hinged at an extremity. Further it may be seen by the disclosed construction that the hatch cover pivots less than 90° about its axis of rotation between its full open and full closed positions.

While the pivot bearings 30 are here shown for clarity mounted upon the upper surface of the armored surface 16 it will be appreciated that bearings 30 may be readily mounted in or below the armored surface 16 for their protection. The bearings 30 may also be made as an integral part of the collar, since the collar is mounted to the vehicle surface. Alternatively, for example, in the case of the hatch 20 the bearings 30 as well as the collar 24 may be mounted in a ring extending around the hatch opening, and this ring may be rotatable with respect to the armored surface to provide a rotatable hatch.

It may be seen that in the closed position of the hatch cover 12, as illustrated in FIG. 3, that the hatch cover 12 makes an integral and projectile tight continuous closure engagement with the collar. The hatch cover sealing lip 28 continuously abuts the inner surface of an inwardly projecting sealing surface 32 at the upper edge of the collar. Directly continuously adjacent this sealing surface 32 in the interior surface of the collar is a groove providing a ballistic projectile stop 34. A resilient sealing strip 36 is shown compressed between the sealing lip 28 and the sealing surface 32 when the hatch cover is in its closed position. The sealing strip 36 provides protection against dust, water or gas entering the vehicle at the junction between the hatch cover and the collar.

Another resilient sealing strip (not shown) may, of course, also be easily provided at the simple planer line of contact between the lower edge of the hatch cover and the armored surface 16. There the closed hatch cover 12 forward of the pivot bearings 30 overlies and continuously abuts the armored surface 16 just outside of the hatch opening for the full distance between the pivot bearings around the front of the hatch opening.

When the hatch cover is into its fully open position as in FIGS. 2 and 4 it may be seen that the truncated edge of the hatch cover rotates down through the armored surface 16 into the inside of the vehicle through the hatch opening 14. This effectively lowers the height of the hatch cover above the armored surface 16 in its open position. It may be seen that the hatch cover pivots vertically down into the hatch opening directly adjacent to and closely inside of the collar at the rear edge of the hatch opening. In its fully open position the hatch cover extends vertically around the vertical hatch opening, but does not extend horizontally across it to any substantial degree. Thus the hatch opening is unobstructed for personnel ingress and egress and visibility by the hatch cover. This arrangement provides a large round vertical hatch opening which provides much easier and quicker crew ingress and egress than a narrow horizontal hatch opening. The concave exterior surface of the hatch cover corresponds to, and is closely spaced from, the concave interior configuration of the collar so that the hatch cover and the collar may be closely adjacent and generally parallel one another in the open position, thereby conserving space and occupying only a small portion of the hatch opening. The hatch cover does not extend substantially above the collar, and therefore does not provide visual obstruction substantially in excess of that already provided by the collar itself.

It may also be seen that in the open position the overlapping of the hatch cover and collar adds their armor protection in series, thereby increasing the protection of the crew member's head for projectiles from the rear, as may be seen in FIG. 4. The concave interior surface of the hatch cover at its truncated side is dimensioned to extend around the back and shoulders of a crew member positioned in the vehicle with his head extending through the hatch opening, as shown. Thus, that portion of the hatch cover which extends down inside the vehicle in the open position does not interfere in any way with the crew member, and in fact provides additional armored protection for him.

To prevent projectiles from being deflected into the interior of the vehicle when the hatch cover is in its open position, the interior surface of the hatch cover may be provided with rings of additional ballistic projectile stops similar to the stop 34, or other suitable configurations. This is indicated in FIG. 2.

The hatch cover 12 opens until a cover stop 38 or other suitable surface on the hatch cover 12 engages the collar to limit the maximum opening of the hatch cover. Suitable conventional latching means (not shown) may also be provided to retain the hatch cover in this or other desired positions.

As previously discussed, the collar 24 in the embodiment of FIGS. 3 and 4 has a substantially greater angular extent with respect to the pivot bearings 30 than the collar 19 of FIGS. 1 and 2, because a substantial portion of the collar 19 is provided by the second armored surface 22 which angularly intersects with the armored surface 16. This makes it possible to have the hatch opening extend through the intersection of two angular intersecting armored surfaces rather than requiring a large planar surface for the hatch opening. This may be desirable in some vehicle designs. Further, it may be seen from FIGS. 1 and 2 that this can provide a simplified collar 19 construction. Where the angularity of the plane of truncation of the rear edge of the hatch cover is made to correspond with the angularity of the second armored surface 22, the collar 19 and its sealing surface 32 may be built directly into the second armored surface 22, as in FIGS. 1 and 2, yet provide all of the above described advantages of the collar 24.

It may be seen that there has been described herein an improved personnel hatch for an armored vehicle. While the structure herein is considered to be preferred, it is contemplated that further variations and modifications within the purview of those skilled in the art can be made. The following claims are intended to cover all such variations and modifications as fall within the true sphere and scope of the invention.

What is claimed is:

1. In an improved hatch for an armored vehicle wherein said armored vehicle has a first armored surface with a personnel hatch opening therethrough, the improvement comprising:
    an armored collar on said vehicle extending above said first armored surface at the rear side of said hatch opening,
    a clamshell shaped hatch cover extending above said first armored surface at said hatch opening,
    said hatch cover being vertically, pivotably, mounted to said vehicle on pivot bearing means and pivotable thereon between an open position and a closed position, said pivot bearing means being located so as to provide substantially balanced opening and closing of said hatch cover about a horizontal axis centrally of said hatch cover and allowing said hatch cover to pivot less than 90° between said open and said closed position, said hatch cover being truncated at one side rearwardly of said pivot bearing means to only partially enclose said hatch opening in said closed position and to extend less than 180° about said pivot bearing means, said hatch cover having a concave interior surface at said truncated side thereof adapted to extend downwardly behind personnel positioned in said vehicle with their head extending through said hatch opening as said hatch cover is opened, said hatch cover mating with said armored collar at said truncated side thereof in closed position to fully enclose said hatch opening in combination with said collar, said hatch cover in open position being pivoted vertically down into said hatch opening adjacent to and inside of said collar at said rear side of said hatch opening so that said hatch opening is unobstructed by said hatch cover, and wherein said hatch cover in said open position is closely adjacent and generally parallel to said collar, and a resilient sealing strip compressed between said sealing lip and said sealing surface in closed position of said hatch cover, and wherein a ballistic projectile stop is provided adjacent said sealing lip.

2. The hatch cover of claim 1 wherein said armored collar is substantially provided by a second armored surface of said armored vehicle which angularly intersects with said first armored surface, and said hatch opening extends through both said first and second armored surfaces.

3. In combination with a ground transversible vehicle which is provided with armored surfaces to deflect and prevent penetration of ballistic projectiles and having a first armored surface with a personnel hatch opening therethrough, the improvement comprising;
- a hatch cover formed of heavy armor material pivotally attached to said first armored surface substantially over said hatch opening,
- said hatch cover having a clamshell shape and at least one bullet-resistant transparent vision block in said hatch cover,
- said hatch cover being truncated at one side rearwardly of said pivot-bearing means,
- the line of said truncation lying in a plane and terminating in an upwardly extending lip,
- an armored collar enclosing the rear portion of said hatch opening,
- said armored collar terminating in a planar surface adapted to sealingly mate with said lip on said hatch cover,
- a sealing member compressible between said sealing lip and said armored collar and the interior surface of said hatch cover,
- a series of ballistic projectile resistant surfaces which resist the deflection of ballistic projectiles which might enter within said hatch cover on the interior surface of said hatch cover, said hatch cover having a concave interior surface at the plane of truncation which extends downwardly behind the head of personnel positioned in said vehicle hatch opening as their head extends through said hatch opening when said cover is opened, and a stop member positioned on the outer surface of said clamshell hatch cover adapted to interrelate with said armored collar to prevent complete rotation of said hatch cover beyond an arch of rotation of less than 90°.

* * * * *